United States Patent
Mabyalaht et al.

(10) Patent No.: US 11,587,341 B2
(45) Date of Patent: Feb. 21, 2023

(54) METHOD OF DETECTING AT LEAST ONE ELEMENT OF INTEREST VISIBLE IN AN INPUT IMAGE BY MEANS OF A CONVOLUTIONAL NEURAL NETWORK

(71) Applicants: Guy Mabyalaht, Courbevoie (FR); Laurent Kazdaghli, Courbevoie (FR)

(72) Inventors: Guy Mabyalaht, Courbevoie (FR); Laurent Kazdaghli, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 39 days.

(21) Appl. No.: 17/106,955

(22) Filed: Nov. 30, 2020

(65) Prior Publication Data

US 2021/0166092 A1 Jun. 3, 2021

(30) Foreign Application Priority Data

Dec. 3, 2019 (FR) ...................................... 1913654

(51) Int. Cl.
*G06V 30/194* (2022.01)
*G06K 9/62* (2022.01)

(52) U.S. Cl.
CPC ......... *G06V 30/194* (2022.01); *G06K 9/6217* (2013.01)

(58) Field of Classification Search
CPC ...... G06V 30/194; G06V 10/40; G06V 10/82; G06V 40/1347; G06K 9/6217; G06K 9/6271
See application file for complete search history.

(56) References Cited

U.S. PATENT DOCUMENTS

2019/0304092 A1* 10/2019 Akselrod-Ballin ....... G06T 7/13
2020/0082147 A1* 3/2020 Thuillier ............ G06V 40/1376
(Continued)

OTHER PUBLICATIONS

H.E. Kaiming et al.: "Mask R-CNN", 2017 IEEE International Conference on Computer Vision (ICCV), IEEE, Oct. 22, 2017, pp. 2980-2988, XP033283165, DOI: 10.1109/ICCV.2017.322 (See Figure 3 and Section 3).

(Continued)

*Primary Examiner* — Ming Y Hon
(74) *Attorney, Agent, or Firm* — Womble Bond Dickinson (US) LLP (57) ABSTRACT

A method of detecting at least one element of interest visible on an input image, by means of a convolutional neural network, CNN, the method comprises the steps of:
(a) extracting, by means of an ascending branch of a first subnetwork of said CNN of feature pyramid network, FPN, type, a plurality of initial feature maps (C1, C2, C3, C4, C5) representative of the input image at different scales, said FPN further comprising a descending branch and lateral connections between the ascending branch and the descending branch, at least one lateral connection comprising an attention module;
(b) generating, by means of said descending branch of the FPN, a plurality of enriched feature maps (P2, P3, P4, P5) also representative of the input image at different scales, each enriched feature map (P2, P3, P4, P5) incorporating the information from the initial feature maps (C1, C2, C3, C4, C5) of smaller or equal scale;
(d) detecting at least one element of interest visible on an input image, by means of a second subnetwork of said CNN, referred to as detection network, taking said enriched feature maps (P2, P3, P4, P5) as input.

17 Claims, 7 Drawing Sheets

(56) References Cited

U.S. PATENT DOCUMENTS

| | | | |
|---|---|---|---|
| 2020/0117937 A1* | 4/2020 | Lee | G06N 3/0454 |
| 2020/0259638 A1* | 8/2020 | Carmignani | H04L 63/0861 |
| 2021/0383166 A1* | 12/2021 | Nie | G06K 9/6268 |
| 2021/0406646 A1* | 12/2021 | Han | G06N 3/06 |
| 2022/0067331 A1* | 3/2022 | Lee | G06V 10/30 |

OTHER PUBLICATIONS

Tsung-Yi Lin et al.: "Feature Pyramid Networks for Object Detection", ARXIV.Org, Cornell University Library, 201 Olin Library Cornell University, Ithaca, NY 14853, Dec. 9, 2016, XP080738158, DOI:1109/CVPR.2017.106 (See Figures 1-3 and Sections 3 and 4).

Ziyuan Liu et al: "Attention-Based Feature Pyramid Network for Object Detection", Proceedings of the 2019 8th International Conference on Computing and Pattern Recognition, Oct. 23, 2019, pp. 117-121, XP055723714, New York, NY, USA DOI: 10.1145/3373509. 3373529, ISBN:978-1-4503-7657-0 (See Figures 2-5 and Sections 2.1, 2.3 and 3).

Wong Fukoeng et al: "Adaptive learning feature pyramid for object detection", IET Computer Vision, the Institution of Engineering and Technology, Michael Faraday House, Six Hills Way, Stevenage, Herts, SG1 2AY, UK, vol. 13, No. 8, Dec. 1, 2019, pp. 742-748, XP006088102, ISSN: 1751-9632, DOI:10.1049/IET-CVI.2018. 5654 (See Introduction).

Hanchao Li et al. "Pyramid Attention Network for Semantic Segmentation", ARXIV.org, Cornell University Library, 201 Olin Library Cornell University, Ithaca, NY 14853, May 25, 2018, XP081425698 (See Section 3).

* cited by examiner

METHOD OF DETECTING AT LEAST ONE ELEMENT OF INTEREST VISIBLE IN AN INPUT IMAGE BY MEANS OF A CONVOLUTIONAL NEURAL NETWORK

GENERAL TECHNICAL FIELD

The present invention relates to the field of biometrics, and in particular proposes a method for detecting at least one element of interest visible in an input image, in particular at least one biometric print, by means of a convolutional neural network, as well as a method of training the convolutional neural network.

STATE OF THE ART

Biometric authentication/identification consists of the recognition of an individual on the basis of biometric traits of that individual such as fingerprints (fingerprint recognition), palm prints, retinal prints, iris or face (facial recognition). Conventional biometric approaches use characteristic information of the biometric trait extracted from the acquired biometry, called features, and the training/classification is done on the basis of the comparison of these characteristics.

In particular, in the case of fingerprint recognition, fingertip images are processed so as to extract the features of a print that can be classified into three categories:

Level 1 defines the general pattern of this print (one of the four classes: right loop, left loop, arch and spiral), and the overall outline of the ridges (in particular, an orientation map called "Ridge Flow Matrix"—RFM map—is obtained, which represents the general direction of the ridge at each point of the print).
  Level 2 defines the particular points of prints called minutiae, which are "events" along ridges (end of a ridge, bifurcation, etc.). The conventional recognition approaches essentially use these features.
  Level 3 defines more complex information such as the shape of ridges, skin pores, scars, etc.

The method of extracting features from a print (in the form of feature maps) is called "encoding," which make it possible to compose a signature called "template" encoding the useful information in the final phase of classification. More specifically, classification will be done by comparing feature maps obtained with one or more reference feature maps associated with known individuals.

While there are now "encoders" available that can efficiently perform this operation of extracting features from prints acquired in a relatively standardized manner (for example on biometric system terminals), there is a difficulty with so-called latent prints, for example those found at a crime scene. Two images of prints of the same identity can have strong rotations relative to each other, occultations as well as a set of distortions. In addition, the background of latent prints is generally very noisy and there is a risk that minutiae may be mistakenly identified in this background.

As a result, the automatic processing of latent prints is currently preceded by a task carried out by an expert, consisting of manually "encircling" each latent print of interest to isolate it, before providing it to the encoder. This task amounts to a segmentation operation of the latent prints, with the encircled zones being referred to as "segmentation masks", and as such it would be desirable to implement it automatically.

Dedicated convolutional neural networks (CNNs) are known, such as the U-Net network (see the publication RONNEBERGER, Olaf, FISCHER, Philipp, and BROX, Thomas. *U-Net: Convolutional networks for biomedical image segmentation. In: International Conference on Medical image computing and computer-assisted intervention. Springer, Cham,* 2015. p. 234-241), or the Mask R-CNN network (see the publication Kaiming He Georgia Gkioxari Piotr Dollar Ross Girshick, Mask *R-CNN, Facebook AI Research (FAIR),* 20 Mar. 2017), but in practice it is found that the results for fingerprints do not live up to expectations.

More recently, the CNN FingerNet (see TANG, Yao, GAO, Fei, FENG, Jufu, et al. *Fingernet: An unified deep network for fingerprint minutiae extraction. In:* 2017 *IEEE International Joint Conference on Biometrics (IJCB). IEEE,* 2017. p. 108-116) enables this segmentation task, among others, but it proves to be far too cumbersome and complex for practical use.

It would therefore be desirable to have a more efficient and less cumbersome solution for the segmentation of images, in particular biometric prints such as latent fingerprints, in order to extract their features.

BRIEF DESCRIPTION OF THE INVENTION

According to a first aspect, the present invention relates to a method of detecting at least one element of interest visible on an input image, by means of a convolutional neural network, CNN, the method being characterized in that it comprises the implementation, by data processing means of a client, of steps of:

(a) extracting, by means of an ascending branch of a first subnetwork of said CNN of feature pyramid network, FPN, type, a plurality of initial feature maps representative of the input image at different scales, said FPN further comprising a descending branch and lateral connections between the ascending branch and the descending branch, at least one lateral connection comprising an attention module;
  (b) generating, by means of said descending branch of the FPN, a plurality of enriched feature maps also representative of the input image at different scales, each enriched feature map incorporating the information from the initial feature maps of smaller or equal scale;
  (d) detecting at least one element of interest visible on an input image, by means of a second subnetwork of said CNN, referred to as detection network, taking said enriched feature maps as input.

According to other advantageous and non-limiting characteristics: For each enriched feature map, an initial feature map of the same scale is transmitted from the ascending branch to the descending branch of the FPN via a lateral connection uniquely associated with this initial feature map.

The initial larger-scale feature map is not transmitted from the ascending branch to the descending branch of the FPN.

The smallest-scale enriched feature map is generated from the smallest-scale initial feature map, each other enriched feature map is generated from the initial feature map of the same scale and a smaller-scale enriched feature map.

Each lateral connection comprises an attention module for focusing the initial feature map transmitted via said lateral connection.

Each other enriched feature map is generated by adding the initial feature map focused by the attention module and the smallest-scale enriched feature map scaled to the same scale as said initial feature map.

The lateral connection associated with the smallest-scale initial feature map comprises a first attention module, and each other lateral connection comprises a second attention module.

The first attention module is a feature pyramid attention module, FPA; and/or the second attention module is a global attention module for upsampling, GAU.

The method further comprises a step (c) of identifying in the enriched feature maps, by means of a third subnetwork of said CNN of region proposal network, RPN, type, regions of interest potentially containing an element of interest.

Step (c) comprises the realignment by a CNN trimming module of each enriched feature map according to identified regions of interest, step (d) being implemented on the realigned enriched feature maps.

The method comprising a prior training step (a0), by data processing means of a server, from an image database of elements of interest already annotated, of parameters of said CNN.

Step (d) comprises segmenting the input image.

The elements of interest are biometric prints, the method comprising a processing step (e) of said segmented input image to extract said desired features from each biometric print represented by said input image.

Said biometric prints are fingerprints, the desired features to be extracted from the at least one fingerprint represented by said input image comprising the position and/or orientation of minutiae.

The at least one biometric print represented by the input image is that of an individual, the method further comprising a step (f) of identifying or authenticating said individual by comparing the desired features extracted from the biometric print represented by said input image with the reference biometric print features.

In accordance with a second and a third aspect, a computer program product is proposed comprising code instructions for executing a method according to the first aspect of detecting at least one element of interest visible in an input image; and a storage means readable by computer equipment on which a computer program product comprises code instructions for executing a method according to the first aspect of detecting at least one element of interest visible in an input image

DESCRIPTION OF THE FIGURES

Other characteristics and advantages of the present invention will appear upon reading the following description of a preferred embodiment. This description will be given with reference to the attached drawings in which.

DETAILED DESCRIPTION

Architecture

According to two additional aspects of the invention, the following is proposed:

A method of detecting at least one element of interest visible in an input image, in particular at least one biometric print, by means of a convolutional neural network, CNN, and, if appropriate, extracting desired features from the at least one biometric print represented by the input image;

A training method of the parameters of said CNN.

The input or training data is of image type, and at least one element of interest is visible therein.

Here, the term "element of interest" refers to any representation in the image of an entity whose detection in an image is desired. Each element of interest is from one given category, corresponding to a type in a semantic meaning. For example, categories such as person, face, vehicle, biometric print, etc. can be considered.

Each element of interest is preferably a biometric print, i.e. a biometric trait (in other words these are images representing at least one biometric trait), advantageously chosen from a fingerprint, a palm print, a retinal print, etc., and generally any print that can be represented by an image and uniquely associated with an individual. Preferably, said biometric print is a fingerprint and this example will be taken in the remainder of the description (as will be seen, the present method is most particularly effective especially in the case of latent fingerprints).

"Detection" or "recognition" is the most basic operation, and designates the simple marking of an element of interest from a known category in an image. Detection thus combines localization (typically determination of the position and size of a box, referred to as detection box, enclosing the element of interest) and classification (determining its category).

The detection of elements of interest thus consists in practice in the generation of one or more "annotations" of some kind that locate, in the input image, the zone or zones of the input image that contain an element of interest such as a biometric print, for example boxes enclosing the elements of interest, referred to as detection boxes (defined by their size and position).

In the preferred case where the detection is more specifically a "segmentation", the generated annotation is a "segmentation mask" (or segmentation map) of the input image (see for example FIG. 6), i.e. a binary image of the same size as the initial image. Specifically, pixels in the input image having a corresponding "white" pixel in the segmentation mask are considered to be pixels of an element of interest, and pixels in the input image having a corresponding "black" pixel in the segmentation mask are considered to be background pixels (and therefore of no interest).

It is assumed that a related set of white pixels in the segmentation mask is a detected element of interest, and there may be several elements of interest such as biometric prints on the same input image (especially in the case of latent fingerprints, where an individual may have placed several fingers next to each other on a surface): the application of the mask to the input image isolates each biometric print represented therein, in the same way that an expert would manually encircle each print detected. The benefit of the segmentation mask is that on the one hand the detection is more refined (the outline of the elements of interest is available), and on the other hand the background of the image is "hidden" so that other image processing algorithms can be implemented without being affected by details of this background.

The optional underlying extraction of features typically consists of "encoding" a detected or even isolated print as a result of the mask, i.e. said desired features to be extracted are typically "biometric" features, i.e. the "final" features that enable a template of the print to be composed as a biometric trait of an individual for the purposes of carrying out classification (identification/authentication of an individual, see below). As such, in the case of fingerprints, said desired features typically describe minutiae, i.e. they comprise the position and/or orientation of the minutiae. However, it should be understood that the present method is not limited to this embodiment, and all features that may be of interest in biometrics can be extracted.

Figure 1:
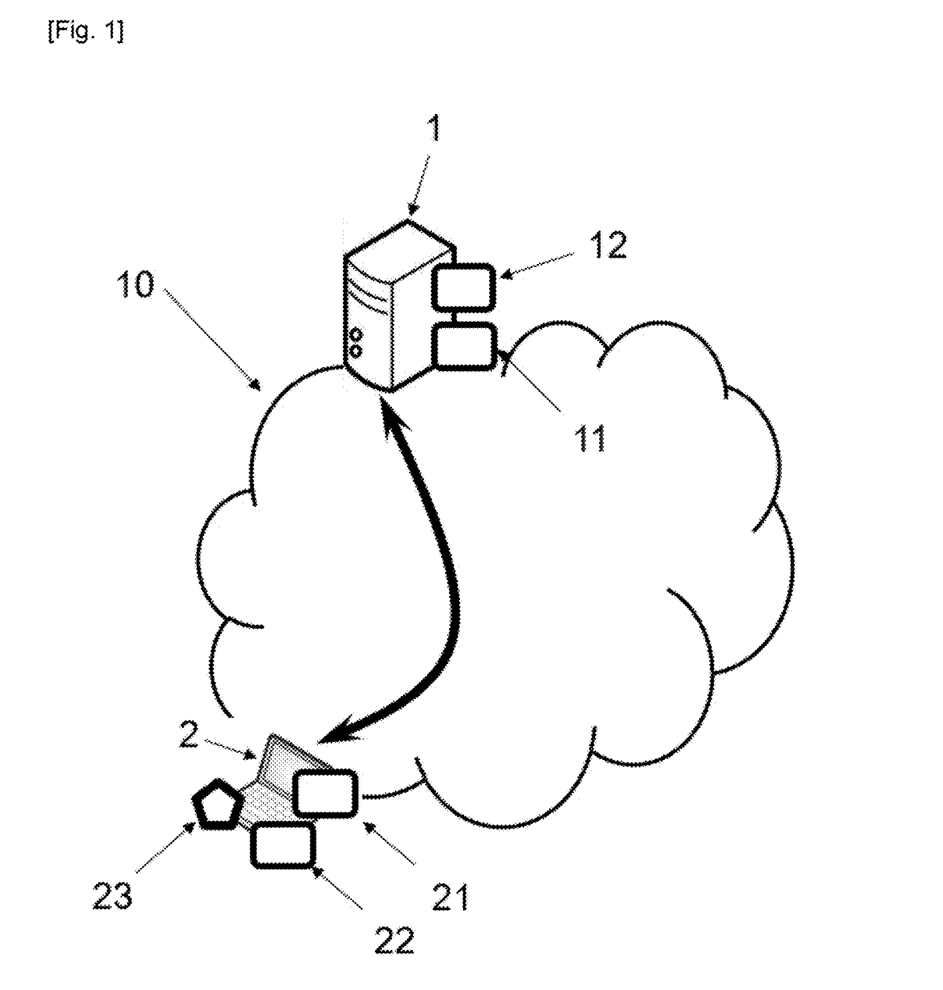
FIG. 1 is a diagram of an architecture for implementing the method according to the invention.

The present methods are implemented within an architecture such as shown in FIG. 1, thanks to a server 1 and a client 2. Server 1 is the training device (implementing the training method) and client 2 is a use device (implementing the detection/segmentation method and, if appropriate, the feature extraction method), for example a user terminal. It is entirely feasible that the two devices 1, 2 are combined, but preferably server 1 is that of a security solution provider, and client 2 is a consumer device, particularly a biometric print scanner, but also a smartphone, a personal computer, etc. Client device 2 advantageously comprises optical capturing means 23, so that said input image can be directly captured, typically for live processing; alternatively, the input image is loaded onto client device 2 (e.g. latent fingerprints can be photographed at a crime scene by a forensic team, and these photos then loaded onto a dedicated client device 2 back at the forensic facility).

In any case, each device 1, 2 is typically a remote computer equipment connected to an extended network 10 such as the Internet for the exchange of data. Each comprises data processing means 11, 21 of processor type, and data storage means 12, 22 such as computer memory, for example a flash memory or a hard disc.

Server 1 stores a training database, i.e. a set of images that have already been annotated (i.e. for which a segmentation mask is already available for example) as opposed to the so-called input images that are actually sought to be processed.

Mask R-CNN

Figure 2:
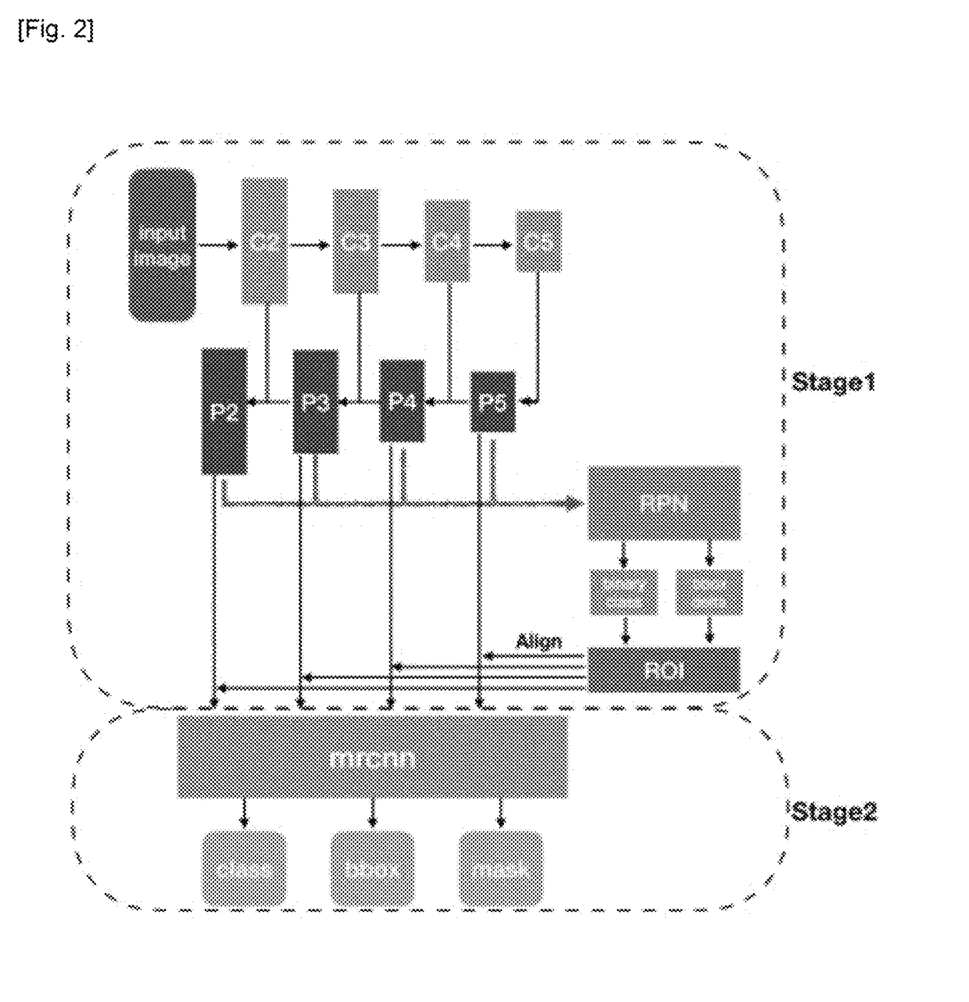
FIG. 2 shows a known example of a Mask R-CNN convolutional neural network.

As explained, the Mask R-CNN network is known in particular and its architecture is shown in FIG. 2. With reference to this FIG. 2, Mask R-CNN is a CNN divided into two sets, marked stage 1 and stage 2. This invention will focus on a CNN having an architecture similar to Mask R-CNN.

"Stage 1" enables pre-processing of the input images, and essentially comprises a first feature pyramid network (FPN) subnetwork, the operation of which will be described in more detail below.

The "Stage 2" or "head" completes the detection and concludes (it generates the desired output, i.e. a segmentation mask and/or one or more detection boxes and/or classes, of the detected elements of interest). In this regard, the head constitutes a second subnetwork referred to as detection network, and can be of many types, in particular a fully connected network (FCN).

Stage 1 of Mask R-CNN also comprises a third subnetwork of Region Proposal Network (RPN) type, which is also a detection network, and a trimming module ("ROI align" with ROI meaning "Region of Interest"). The FPN identifies potential regions of interest in the feature maps of the FPN output (i.e. likely to contain an element of interest), and the trimming module "realigns" the feature maps according to the coordinates of these regions of interest, so as to facilitate the work of the detection network.

As will be seen, the present CNN comprises at least a first FPN-type network and a second detection network-type subnetwork, and optionally the third RPN-type subnetwork and the trimming module.

FPN

The FPN (the first subnetwork) is the most important part of the Mask R-CNN network. It is shown in more detail in FIG. 3a.

Figure 3A:
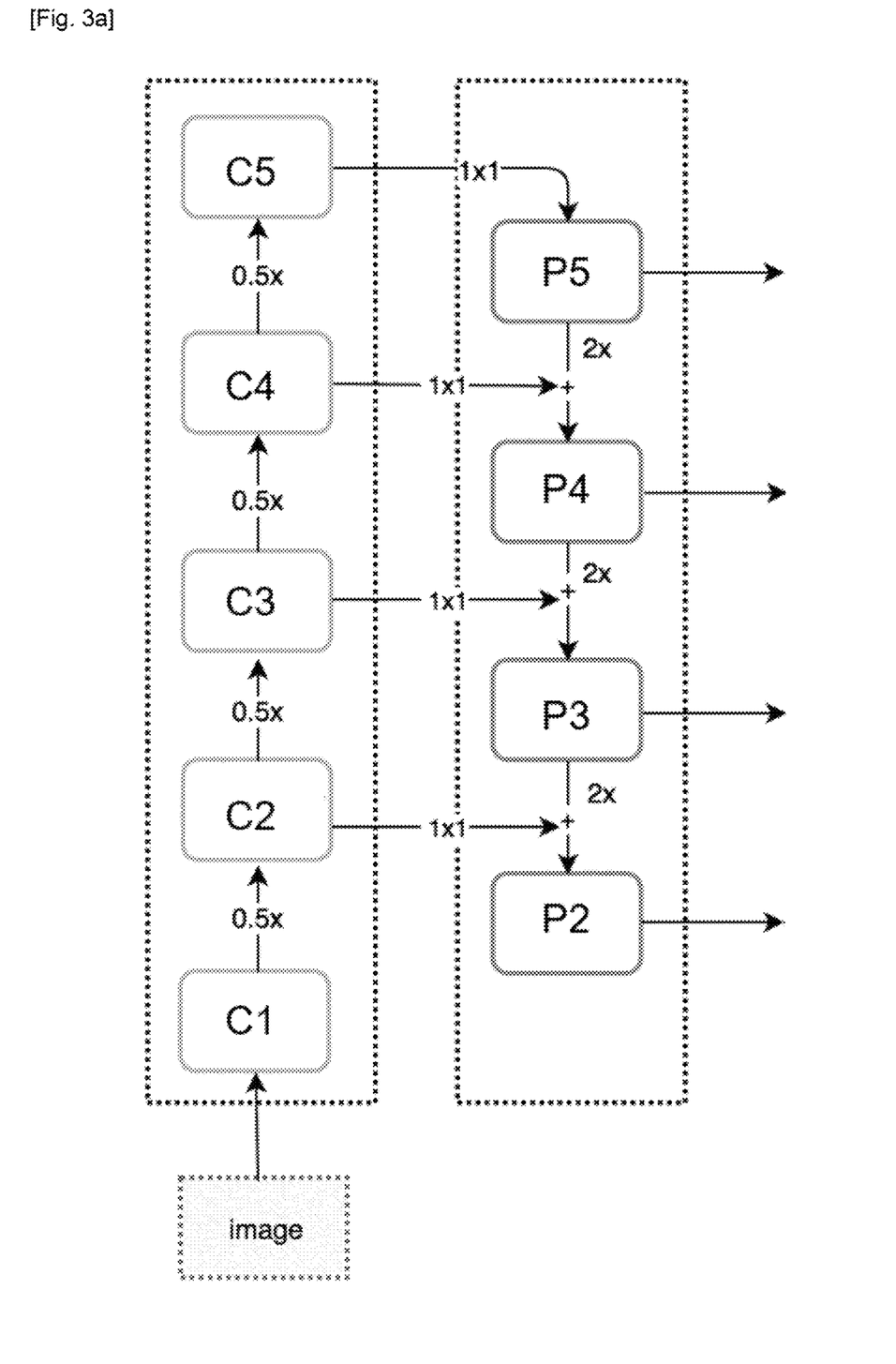
FIG. 3a shows a known example of a feature pyramid subnetwork for a Mask R-CNN convolutional neural network.

The FPN differs in that it comprises an ascending branch ("bottom-up") and then a descending branch ("top-down") and lateral connections between the ascending branch and descending branch.

The ascending branch, also known as the backbone of the network as a whole, is a conventional feature extraction network that can be of many types, and in particular a conventional CNN (direct succession of blocks of convolution layers CONV, batch normalization layers BN, and non-linear layers NL). The backbone extracts from the input image a plurality of initial feature maps C1, C2, C3, C4, C5 representative of the input image at different scales. More precisely, the backbone consists of a plurality of successive convolution blocks, such that the first block produces the first initial feature map C1 from the input image, then the second block produces the second initial feature map C2 to the first initial feature map C1, etc. In the example shown there are 5 blocks (and therefore 5 initial maps, but it is possible to have fewer or more thereof). It is conventionally understood for convolutional neural networks that the scale is smaller with each successive map (in other words the resolution decreases, the feature map becomes "smaller" and therefore less detailed), but of greater semantic depth, since increasingly high-level structures of the image have been captured. Specifically, initial feature maps have increasing numbers of channels as their size decreases.

In practice, a pooling layer is placed between two blocks to decrease the size by a factor of 2, and from one block to another the number of filters of the convolution layers used (generally 3×3 convolutions) is increased (and preferably doubled), in the 5-level case of FIG. 3a there is for example successive channel numbers of 32, 64, 128, 256 and 512, and successive map sizes (for a 512×512 input image) of 512× 512, 256×256, 128×128, 64×64 and 32×32.

According to a preferred embodiment, said backbone (ascending branch of the FPN) is of residual network type. A residual network, or ResNet, is a CNN with at least one "skip connection" (or simply "short-cut"), i.e. a connection from which at least one layer is "short-circuited", by analogy to what is found in the pyramidal neurons of the brain. In practice, there is at least one skip connection per block.

Indeed, when a model is made more complex by adding layers, some of these layers can have a negative impact on the model's performance. Residual connections ensure that if a useful transformation is not learned, one layer must at worst learn the identity, avoiding degrading the performance of the other layers. The operating principle behind the residual networks is to add point by point the entry and exit of a convolution layer, allowing the signal to propagate from the superficial layers to the deeper ones.

The backbone (ascending branch of the FPN) can even be a "densely connected" network type (or simply dense network, or DenseNet); i.e. not only does it have at least one skip connection, but each block is said to be dense, i.e. it comprises all possible skip connections, i.e. each skip connection linking an input of a first layer of the block to an output of a second layer of the block downstream to the first layer.

The feature maps C1, C2, C3, C4, C5 obtained by the ascending branch are said to be initial because they will be reprocessed by the descending branch. Indeed, as explained, "low" maps have a higher spatial resolution but a shallow semantic depth. The descending branch aims to increase their semantic depth by virtue of the information in the "high" maps.

Thus, said descending branch of the FPN generates, from the initial feature maps C1, C2, C3, C4, C5, a plurality of enriched feature maps P2, P3, P4, P5 that are always representative of the input image at different scales, but incorporating the information from the initial feature maps C1, C2, C3, C4, C5 of smaller or equal scale.

In other words, each enriched map Pi has the scale of the corresponding initial map Ci (i.e. same size) but incorporates the information of all maps {Cj}, for each j≥i. In practice, each enriched map Pi is generated according to the corresponding initial map Ci and/or the next enriched map Pi+1, hence the "ascending and descending" nature of the branches (i.e. "U" shaped): the initial maps C1, C2, C3, C4, C5 are obtained in ascending order (C1 then C2 then C3 then C4 then C5) and then the enriched maps are obtained in descending order (P5 then P4 then P3 then P2).

Indeed, the maximum semantic level is obtained at the last map C5, and from there each Ci map is enriched on the way back down again with the information of the already enriched maps C5 . . . Ci+1. The lateral connections between the ascending branch and the descending branch provide the descending branch with the various initial maps. In practice:

- The last enriched map P5 is only generated from the last initial map C5 (since the latter already has the maximum semantic depth). Note that it is possible to have P5=C5, but in general a 1×1 convolution is used to reduce its number of channels (for example by a factor of 2, i.e. to 256);
- The penultimate enriched map P4 is generated from the penultimate initial map C4 (supplied via the lateral connection) and the last enriched map P5, so as to add the semantic depth of the enriched map P5 to the initial map C4,
- The enriched map P3 is generated from the initial map C3 (provided via the lateral connection) and the enriched map P4, so as to add the semantic depth of the enriched map P4 to the initial map C3,
- The enriched map P2 is generated from the initial map C2 (provided via the lateral connection) and the enriched map P3, so as to add the semantic depth of the enriched map P3 to the initial map 02,
- There is advantageously no enriched map P1 generated from the initial map C1 because the latter has a very high spatial resolution, and this optional enriched map P1 would be especially huge.

Preferably, the generation of an enriched map Pi based on the corresponding initial map Ci and the higher enriched map Pi+1 (i.e. the case of all but the second enriched map) comprises rescaling of the enriched map Pi+1, typically doubling the scale if there has been halving of scale in the ascending branch (which is called upsampling), e.g. via the nearest neighbors method, then the element by element sum of the initial map Ci (if appropriate with the number of channels adapted via a 1×1 convolution) and the scaled enriched map Pi+1 (since both maps are now the same size).

Thus, all the enriched maps P2, P3, P4 and P5 ultimately have the same number of channels (256 in the example shown).

Principle

The inventors found that the Mask R-CNN network "oversegments". This means that it wrongly considers elements of the background to be elements of interest. More precisely, the elements of interest are correctly detected, the problem arises at the pixel level. Thus, this does not necessarily have an impact on simple detection (the detection boxes may be just a bit too large), but it is particularly evident for segmentation masks. For example, in reference to FIG. 6, the top line represents latent fingerprints, and the middle line represents the segmentation masks obtained via Mask R-CNN as is: it is clear to see that these masks incorporate false elements, such as fragments of the letter "E" from the background of the left image. This is problematic because the segmentation mask should discriminate the element of interest from the background as closely as possible.

In fact, it is observed that the idea of retaining all information in the enriched feature maps means that "useless" information is also retained that relates to the background rather than the elements of interest, hence the risk of oversegmentation.

The idea of the present method is to incorporate means of improving the "attention" between the ascending branch and descending branch into the FPN so as to destroy useless information.

Figure 3B:
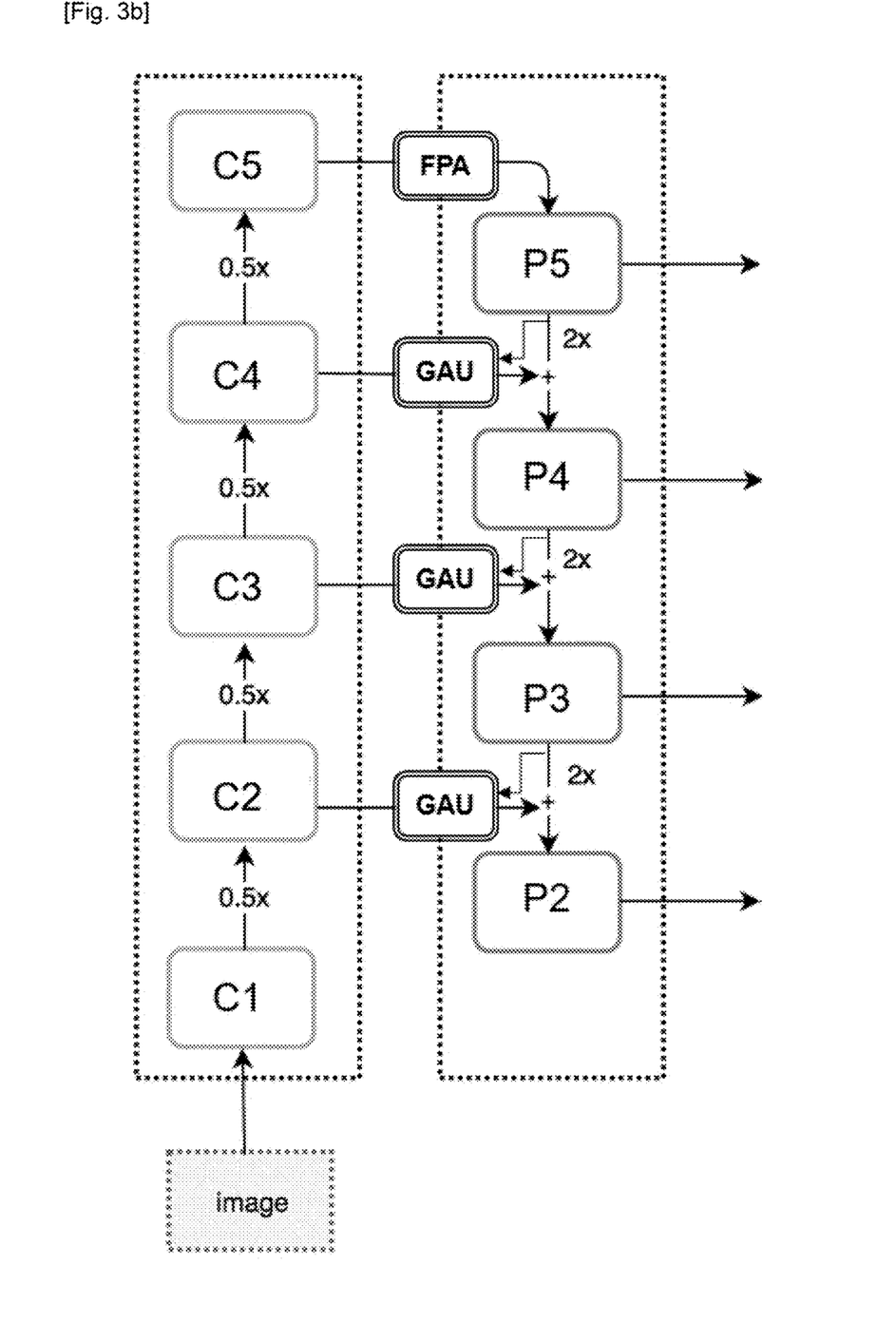
FIG. 3b shows an example of a feature pyramid subnetwork for a convolutional neural network for the implementation of the method according to the invention.

It is supposed that each lateral connection is uniquely associated to an initial feature map C2, C3, C4, C5 and transmits this feature map from the ascending branch to the descending branch of the FPN. In particular, for at least one enriched feature map P2, P3, P4, P5 (and preferably each enriched feature map P2, P3, P4, P5), an initial feature map C2, C3, C4, C5 of the same scale is transmitted from the ascending branch to the descending branch of the FPN via the lateral connection uniquely associated with this initial feature map C2, C3, C4, C5.

Preferably, there is a lateral connection for each initial feature map C2, C3, C4, C5 other than the largest-scale initial feature map 01 (i.e. the largest-scale initial feature map 01 is not transmitted from the ascending branch to the descending branch of the FPN) and/or a lateral connection for each enriched feature map P2, P3, P4, P5, as each enriched feature map P2, P3, P4, P5 is generated at least from the initial feature map C2, C3, C4, C5 of the small scale, in particular the smallest-scale enriched feature map P5 is generated only from the smallest-scale initial feature map C5 and each other enriched feature map P2, P3, P4 is generated from the initial feature map C2, C3, C4 of the same scale and a smaller-scale enriched feature map P3, P4, P5, in a cascade.

Specifically, at least one of the lateral connections of the FPN comprises an attention module, in particular a lateral connection associated with a an initial feature map C2, C3, C4 other than the smallest-scale initial feature map C5, advantageously also the lateral connection associated with the smallest-scale initial feature map C5 comprises an attention module, and preferably each lateral connection. The attention module of a lateral connection is for focusing the initial feature map C2, C3, C4, C5 transmitted via said lateral connection (i.e. the one to which it is associated). Thus, the initial feature map C2, C3, C4, C5 transmitted via a lateral connection provided with an attention module is referred to as "focused". Typically, the attention module replaces the optional 1×1 convolution.

Therefore, at least on enriched feature map P2, P3, P4 other than the smallest-scale enriched feature map P5 (and preferably each enriched feature map P2, P3, P4 other than the smallest-scale enriched feature map P5) is generated by adding the initial feature map C2, C3, C4 (associated to the lateral connection provided with an attention module) focused by the attention module and a smaller-scale enriched feature map P3, P4, P5 scaled to the same scale as said initial feature map C2, C3, C4.

An attention module is a module that destroys feature map information that is not related to the elements of interest (i.e., related to the background), thereby focusing the attention of the second detection subnetwork on the elements of interest, thereby limiting oversegmentation.

A first and a second type of possible attention module, respectively referred to as feature pyramid attention (FPA) module and global attention upsample (GAU) module, respectively, will now be described. As will be seen, advantageously the last lateral connection of the FPN (the bar of the "U") comprises the first FPA module, and each other lateral connection of the FPN comprises the second GAU module, as shown in FIG. 3b. Nevertheless, the invention shall not be limited to these examples of attention modules. The FPA and GAU modules are described in the document Hanchao Li, Pengfei Xiong, Jie An, Lingxue Wang; *Pyramid Attention Network for Semantic Segmentation* to which persons skilled in the art can refer.

It should be noted that in this document the FPA and GAU modules are not strictly used as attention modules in the sense of the present invention, but directly as encoders: indeed, in this document the network described ("pyramid attention network") is directly a segmentation network, and not a first subnetwork for generating enriched feature maps P2, P3, P4 and P5 for a second detection subnetwork. In other words, the descending branch of the described network does not serve to enrich the initial feature maps C1, C2, C3, C4 and C5 of the ascending branch, but only to generate the segmentation mask (which is an image, hence the encoder function of the modules) from the initial feature maps. Such a segmentation network is too simple, especially for latent fingerprints, and does not give better results than Mask R-CNN (the middle line of FIG. 6).

Figure 6:
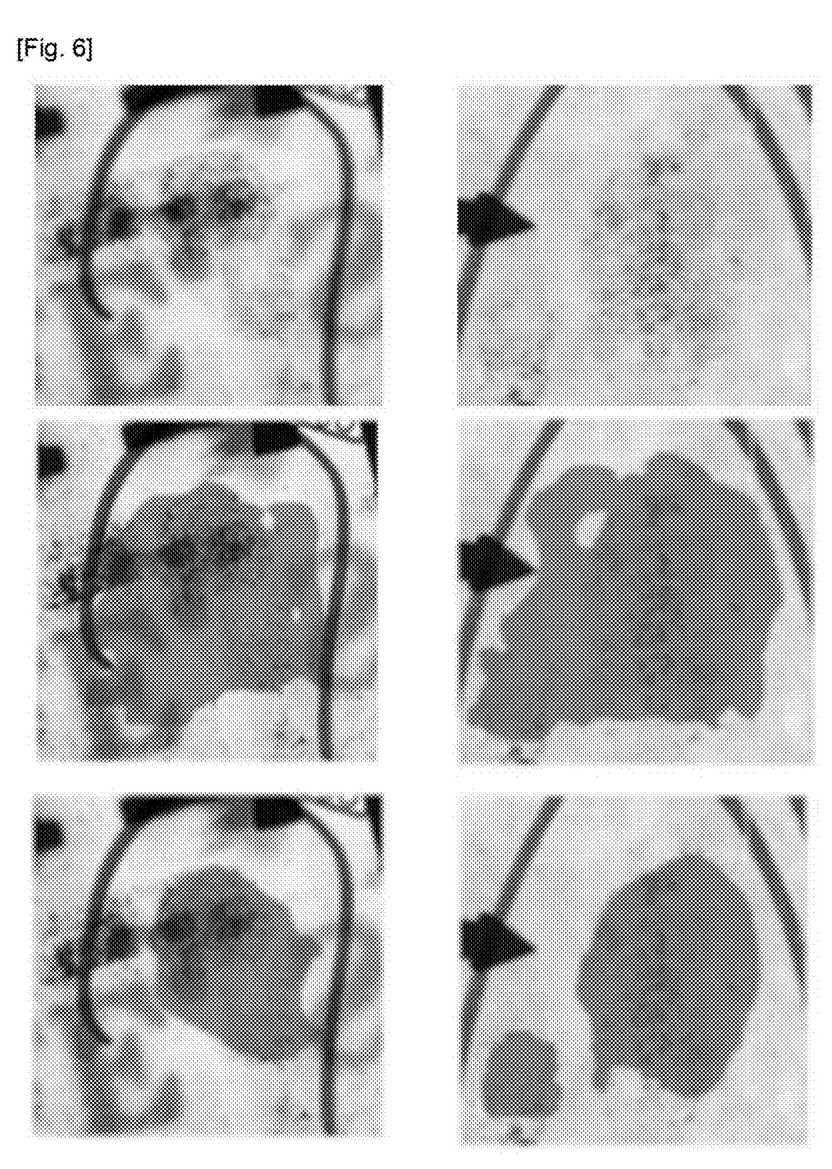
FIG. 6 compares examples of segmentation masks obtained with the state of the art, and embodiments of the method according to the invention.

The inventors found that using the FPA and GAU not to generate the mask but as an attention module to simply "control" the enrichment of the initial feature maps by focusing them in a pyramid architecture greatly facilitates the work of the separate detection network and delivers results far beyond anything that could have been expected, see in particular the last line of FIG. 6 where the highly realistic segmentation masks obtained can be seen.

Moreover, the processing time is extremely short. Table 1 below (which will be described in detail later) shows that compared to FingerNet, which is the only network currently able to segment latents (and the quality of the masks obtained by FingerNet still falls short of the results visible in FIG. 6), the identification time of a latent print is 10 times shorter when using the present CNN (referred to as MRCNN-Idemia) for segmentation, making real-time use possible.

TABLE 1

| | | None | Ground Truth | FingerNet | MRCNN-Idemia |
|---|---|---|---|---|---|
| Accuracy | Rank 1 | 66.30% | 67.40% | 67.80% | 67.40% |
| | Rank 10 | 70.60% | 71.80% | 71.70% | 72.20% |

TABLE 1-continued

| | | | None | Ground Truth | FingerNet | MRCNN-Idemia |
|---|---|---|---|---|---|---|
| Computing time | 1024 × 1024 | CPU | — | — | 27.400 s | 2.600 s |
| | | GPU | — | — | 1.120 s | 0.140 s |

FPA

Figure 5A:
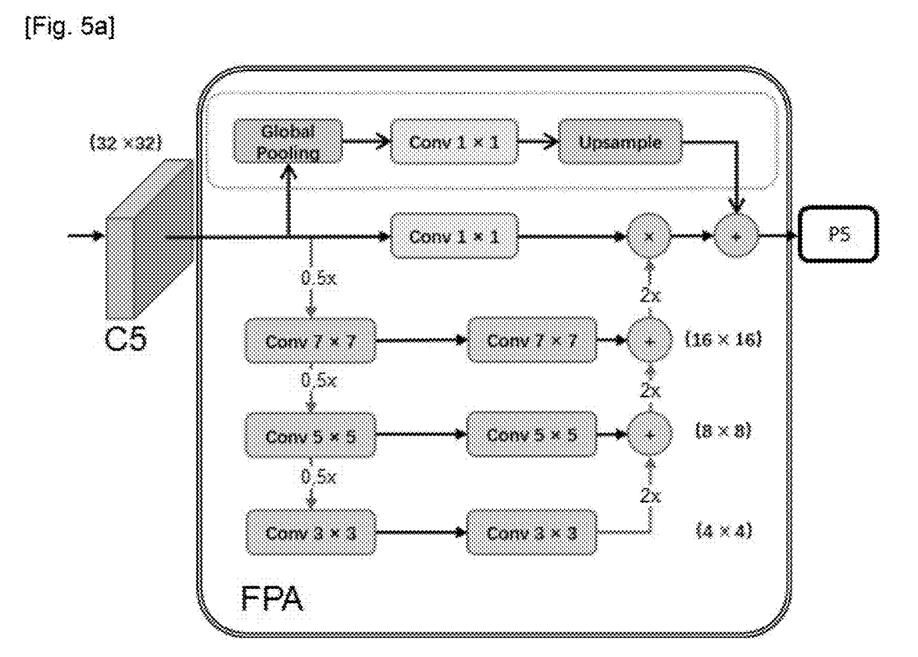
FIG. 5a shows an example of a global attention module for upsampling.

With reference to FIG. 5a, the FPA module is placed on the last lateral connection (it allows the last enriched map P5 to be generated from the last initial map C5). It advantageously comprises a block constituting a "mini" FPN (hence the U-shaped geometry), and continuing virtually on a few levels decreasing then re-increasing the size of the feature map (for C5 of 32×32 in size, maps of 16×16, 8×8 and 4×4 are generated). This enables the presence of additional stages C6, and C7 and C8 to be simulated, so that P5 is not just a transposition of C5 but virtually "incorporates" information from C6, C7 and C8.

Since these sizes are really small, 7×7, 5×5 and 3×3 convolutions can be used without this having any impact on the processing time (it is recalled that there are only 3×3 convolutions in ResNet and especially RestNet-101, which is preferentially used for the backbone). This information is not added to the original C5 feature map but multiplied element by element to effectively focus the information in this P5 map relative to the C5 map. It is thus understood that the P5 map contains less information in practice than C5, but it remains "enriched" because useless information has been replaced by useful information.

It should be noted that in addition to the mini-FPN, as shown in FIG. 5a, there can optionally be a global average pooling branch (a feature map is obtained reduced to 1 pixel but with a large number of channels) and then resampling to obtain a map of the size of the input.

GAU

Figure 5B:
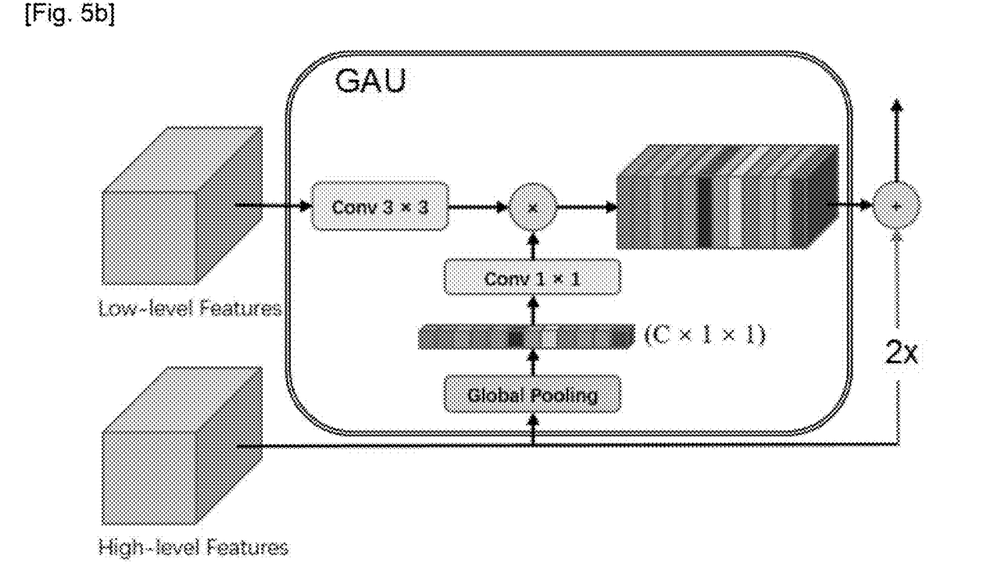
FIG. 5b shows an example of a feature pyramid attention module.

With reference to FIG. 5b, the GAU module is placed on the other lateral connections, for the generation of the other initial maps Pi, i=2, 3 or 4 involving an addition with the higher scaled enriched map Pi+1.

The GAU module takes both the initial map Ci of the lateral connection, and also the higher enriched map Pi+1 (not yet scaled) as input.

This GAU module implements global average pooling of the higher enriched map Pi+1. In other words, the enriched map is reduced to an object with dimensions 1×1×C (one pixel with a large number C of channels), which goes through a 1×1 convolution to control the number of channels, a batch normalization and a non-linear layer (ReLU) and then as in the FPA is multiplied element by element with the initial input map Ci to focus its attention on the elements of interest as apparent in the higher enriched map Pi+1. It is this initial "focused" map Ci that can then be summoned with the scaled enriched map Pi+1 (since both maps are again the same size) in the descending branch so as to obtain the enriched map Pi, which is itself focused through transitivity.

Method

Figure 4:
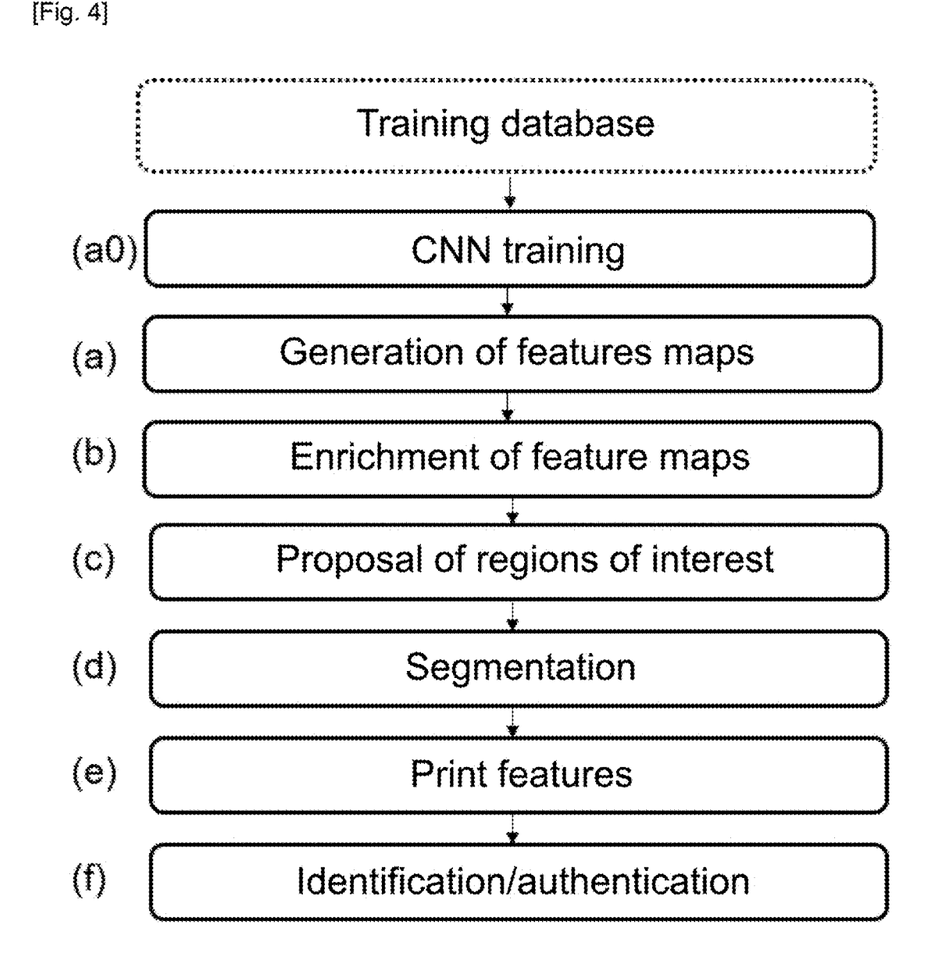
FIG. 4 shows the steps of a preferred embodiment of the method according to the invention.

In summary, with reference to FIG. 4, the present method of detecting at least one visible element of interest (advantageously of the biometric print type) in an input image begins with a step (a) of extracting, by means of the ascending branch of the first FPN subnetwork of said CNN, a plurality of initial feature maps C1, C2, C3, C4, C5 representative of the input image at different scales, said FPN further comprising a descending branch and lateral connections between the ascending branch and the descending branch, at least one (preferably each) lateral connection comprising an attention module as explained.

Then, in a step (b), the method comprises generating, by means of said descending branch of the FPN, a plurality of enriched feature maps P2, P3, P4, P5 also representative of the input image at different scales, each enriched feature map P2, P3, P4, P5 incorporating the information from the initial feature maps C1, C2, C3, C4, C5 of smaller or equal scale. As explained, it is understood that each attention module allows the initial feature maps C2, C3, C4, C5 received via the lateral connections to be "focused" when they are taken into account in the generation of the enriched maps P2, P3, P4, P5. In an optional step (c), a third RPN subnetwork of said CNN identifies, in the enriched feature maps P2, P3, P4, P5, a set of regions of interest potentially containing an element of interest, and if appropriate a trimming module realigns each enriched feature map P2, P3, P4, P5 according to the identified regions of interest.

In a step (d) the method then comprises the detection itself, by means of the second subnetwork of said CNN, referred to as detection network, taking said enriched feature maps P2, P3, P4, P5, if necessary realigned by means of the trimming module, as input Preferably, each enriched feature map P2, P3, P4, P5 is taken as input to the detection network.

If said detection network is a segmentation network, the result of the detection (i.e. the output of the second subnetwork is a segmentation mask).

In an optional step (e), said segmented input image (i.e. to which the segmentation mask has been applied as explained) is advantageously processed so as to extract desired features from the at least one biometric print visible on said input image.

Training

Advantageously, the method begins with a training step (a0), by the data processing means 11 of server 1, from a database of biometric print images already annotated (i.e. for which a detection result is available sum a box or a segmentation mask), of parameters of said CNN. It is noted that the parameters of all subnetworks can be trained at the same time, or subnetwork by subnetwork, and if appropriate block by block in a subnetwork (by freezing those of the other blocks). In particular, it is possible to train the blocks of the FPN starting from the end (C5/P5, then C4/P4, etc.), at the same time as the whole detection network and the optional RPN.

This training can be carried out in a conventional way. The training cost function can be composed of an attachment to the conventional data—average quadratic error—and a total variation regularization.

Conventionally, in the case of biometric prints of fingerprint type, a good-quality print database can be used as a starting point and augmentation algorithms can be implemented in order to multiply the size of the training database and artificially fabricate latent prints (e.g. by distorting good-quality prints, creating occlusions, etc.), to ensure the robustness of the CNN against common acquisition deficiencies.

The trained CNN may be stored if appropriate on data storage means 22 of client 2 for use in detection. It should be noted that the same CNN can be embedded on numerous clients 2, only one training is necessary.

Identification/Authentication

As explained, in a step (e) said segmented image can be processed so as to extract said desired features from the at least one biometric print represented by said input image, which may in particular comprise the position and/or orientation of minutiae in the case of fingerprints.

As explained, step (d) can comprise applying the segmentation mask obtained to the input image so as to isolate the represented print or prints as separate images. Indeed, there can be several biometric prints on a single input image. Step (e) is advantageously implemented for each print isolated.

Preferably, the method further comprises a step (f) of identifying or authenticating at least one individual by comparing the desired features extracted from the (or each) biometric print represented by said input image, with the features of reference biometric prints, which may be implemented in any manner known to a person skilled in the art.

For example, client 2 may store the features of the prints of one or more persons entered in a police file as reference prints, so that the person who left a latent print can be identified: if the features extracted correspond to those expected from a known individual, the identity of that individual is transmitted to the police force.

Alternatively, client 2 can send the extracted features to a database remote from said reference biometric print features, for identification of the individual.

It should be noted that steps (e) and/or (f) can be implemented as a classification step of an isolated print, for example via one or more dedicated CNNs, and if appropriate comprise enhancement processing of the isolated prints, see in particular the application FR 1860323.

Results:

Table 1 above compares, as explained, the performance of the FingerNet network and the present CNN MRCNN-Idemia.

In practice, this is an identification test (step (f)), implemented following training on biometric print databases, which we will call database A and database B. Database A contains 1,117 latent fingerprints and good quality equivalents (TP), and database B contains 100,000 fingerprints TP, and serves as a noise database.

Table 1 shows that for processing a latent image, not only is MRCNN-Idemia is faster, but in rank 10, compared to no processing ("none"), the "ground truth" (i.e. image segmented manually), to and the FingerNet solution (state of the art), accuracy is further improved. It is recalled that rank 10 (looking at 10 candidates) is more relevant for latents than rank 1 (looking only at the best candidate).

This is due, as shown in FIG. 6, to the quality of the segmentation masks obtained despite the very fast processing.

Computer Program Product

According to a second and a third aspect, the invention relates to a computer program product comprising code instructions for executing (in particular on data processing means 11, 21 of server 1 and/or of client 2) a method for detecting at least one element of interest visible on an input image, as well as storage means readable by computer equipment (a memory 12, 22 of server 1 and/or of client 2) on which this computer program product is located.

The invention claimed is:

1. A method of detecting at least one element of interest visible on an input image, by means of a convolutional neural network, CNN, the method being characterized in that it comprises the implementation, by data processing means of a client, of steps of:
(a) extracting, by means of an ascending branch of a first subnetwork of said CNN of feature pyramid network, FPN, type, a plurality of initial feature maps representative of the input image at different scales, said FPN further comprising a descending branch and lateral connections between the ascending branch and the descending branch, each lateral connection transmitting from the ascending branch to the descending branch of the FPN an initial feature map which it is uniquely associated, at least one lateral connection associated with an initial feature map other than the smallest-scale initial feature map comprising an attention module;

(b) generating, by means of said descending branch of the FPN, a plurality of enriched feature maps also representative of the input image at different scales, each enriched feature map incorporating the information from the initial feature maps of smaller or equal scale;

(c) detecting at least one element of interest visible on an input image, by means of a second subnetwork of said CNN, referred to as detection network, taking said enriched feature maps as input.

2. The method according to claim 1, wherein, for each enriched feature map, an initial feature map of the same scale is transmitted from the ascending branch to the descending branch of the FPN via the lateral connection uniquely associated with this initial feature map.

3. The method according to claim 1, wherein the largest-scale initial feature map is not transmitted from the ascending branch to the descending branch of the FPN.

4. The method according to claim 1, wherein the smallest-scale enriched feature map is generated from the smallest-scale initial feature map, each other enriched feature map is generated from the initial feature map of the same scale and a smaller-scale enriched feature map.

5. The method according to claim 1, wherein at least on enriched feature map other than the smallest-scale enriched feature map is generated by adding the initial feature map focused by the attention module and a smaller-scale enriched feature map scaled to the same scale as said initial feature map.

6. The method according to claim 1, wherein the lateral connection associated with the smallest-scale initial feature map comprises an attention module of a first type, the attention module of said lateral connection associated with an initial feature maps other than the smallest-scale initial feature map being of a second type.

7. The method according to claim 6, wherein each lateral connection associated with an initial feature maps other than the smallest-scale initial feature map comprises an attention module of the second type.

8. The method according to claim 7, wherein the first type of attention module is a feature pyramid attention, FPA, module; and/or the second type of attention module is a global attention upsample, GAU, module.

9. The method according to claim 1, further comprising a step of identifying in the enriched feature maps, by means of a third subnetwork of said CNN of region proposal network, RPN, type, regions of interest potentially containing an element of interest.

10. The method according to claim 9, wherein step comprises the realignment by a CNN trimming module of each enriched feature map according to identified regions of interest, step being implemented on the realigned enriched feature maps.

11. The method according to claim 1, comprising a prior training step (a0), by data processing means of a server, from an image database of elements of interest already annotated, of parameters of said CNN.

12. The method according to claim 1, wherein step (d) comprises segmenting the input image.

13. The method according to claim 12, wherein the elements of interest are biometric prints, the method comprising a processing step (e) of said segmented input image to extract said desired features from each biometric print represented by said input image.

14. The method according to claim 13, wherein said biometric prints are fingerprints, the desired features to be extracted from the at least one fingerprint represented by said input image comprising the position and/or orientation of minutiae.

15. The method according to claim 13, wherein the at least one biometric print represented by the input image is that of an individual, the method further comprising a step (f) of identifying or authenticating said individual by comparing the desired features extracted from the biometric print represented by said input image with the reference biometric print features.

16. A computer program product comprising code instructions for executing a method according to claim 1 of detecting at least one element of interest visible in an input image, when said program is executed on a computer.

17. A non-transitory storage means readable by computer equipment on which a computer program product comprises code instructions for executing a method according to claim 1 of detecting at least one element of interest visible in an input image.

* * * * *